(12) United States Patent
Tamrakar et al.

(10) Patent No.: US 11,128,351 B2
(45) Date of Patent: Sep. 21, 2021

(54) UPLINK DATA TRANSMISSION METHOD, TERMINAL, AND NETWORK SIDE DEVICE

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Xin Su, Beijing (CN); Hui Li, Beijing (CN); Qiuping Huang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 20 days.

(21) Appl. No.: 16/496,409

(22) PCT Filed: Mar. 14, 2018

(86) PCT No.: PCT/CN2018/078988
§ 371 (c)(1),
(2) Date: Sep. 20, 2019

(87) PCT Pub. No.: WO2018/171478
PCT Pub. Date: Sep. 27, 2018

(65) Prior Publication Data
US 2020/0395982 A1 Dec. 17, 2020

(30) Foreign Application Priority Data
Mar. 22, 2017 (CN) .......................... 201710172846.7

(51) Int. Cl.
*H04L 12/26* (2006.01)
*H04B 7/0404* (2017.01)
(Continued)

(52) U.S. Cl.
CPC ......... *H04B 7/0404* (2013.01); *H04B 7/0408* (2013.01); *H04B 7/063* (2013.01);
(Continued)

(58) Field of Classification Search
CPC .... H04B 7/0404; H04B 7/0408; H04B 7/063; H04B 7/0695; H04L 5/0051; H04L 5/0226
See application file for complete search history.

(56) References Cited

U.S. PATENT DOCUMENTS

2010/0184444 A1   7/2010  Suo et al.
2016/0065288 A1   3/2016  Yu et al.
(Continued)

FOREIGN PATENT DOCUMENTS

CN      101299871 A    11/2008
CN      101674163 A    3/2010
(Continued)

OTHER PUBLICATIONS

Written Opinion of the International Searching Authority from PCT/CN2018/078988, dated May 24, 2018, with English translation provided by WIPO.
(Continued)

*Primary Examiner* — Minh Trang T Nguyen
(74) *Attorney, Agent, or Firm* — Ladas & Parry, LLP

(57) ABSTRACT

An uplink data transmission method, a terminal, and a network side device are provided. The method includes: receiving, by a terminal, N uplink sounding pilot indices transmitted by a network side device, wherein N is a positive integer larger than 0; and transmitting, by the terminal, uplink data to the network side device in N uplink beam directions corresponding to the N uplink sounding pilot indices.

10 Claims, 6 Drawing Sheets

---

Receiving, by a terminal, N uplink sounding pilot indices transmitted by a network side device, wherein N is a positive integer larger than 0 — 201

Transmitting, by the terminal, uplink data to the network side device in N uplink beam directions corresponding to the N uplink sounding pilot indices — 202

(51) Int. Cl.
*H04B 7/0408* (2017.01)
*H04B 7/06* (2006.01)
*H04L 5/00* (2006.01)
*H04L 25/02* (2006.01)

(52) U.S. Cl.
CPC ......... *H04B 7/0695* (2013.01); *H04L 5/0051* (2013.01); *H04L 25/0226* (2013.01)

(56) References Cited

U.S. PATENT DOCUMENTS

2018/0042000 A1 2/2018 Zhang et al.
2019/0081751 A1* 3/2019 Miao .................... H04B 7/0619

FOREIGN PATENT DOCUMENTS

| CN | 105471771 A | 4/2016 |
|---|---|---|
| CN | 107734559 A | 2/2018 |
| WO | 2016114696 A1 | 7/2016 |
| WO | 2016165128 A1 | 10/2016 |
| WO | 2017027055 A1 | 2/2017 |

OTHER PUBLICATIONS

International Search Report from PCT/CN2018/078988, dated May 24, 2018, with English translation provided by WIPO.
International Preliminary Report on Patentability from PCT/CN2018/078988, dated Sep. 24, 2019, with English translation provided by WIPO.
First Office Action and Search Report from CN app. No. 201710172846.7, dated Mar. 4, 2020, with machine English translation.
Extended European Search Report from EP app. No. 18771512.3, dated Feb. 12, 2020.
3rd Generation Partnership Project; Technical Specification Group Radio Access Network; Study on New Radio (NR) Access Technology, (Release 14), 3GPP TR 38.912, V1.0.0, Mar. 2017.
"Presentation of Specification/Report to TSG: TR 38.912, Version 1.0.0", Tdoc RP-170854, 3GPP TSG RAN Meeting #75, Dubrovnik, Croatia, Mar. 6-9, 2017.

\* cited by examiner

UPLINK DATA TRANSMISSION METHOD, TERMINAL, AND NETWORK SIDE DEVICE

CROSS REFERENCE TO RELATED APPLICATIONS

This application is a U.S. national phase application of a PCT Application No. PCT/CN2018/078,988 filed on Mar. 14, 2018, which claims a priority to a Chinese Patent Application No. 201710172846.7 filed in China on Mar. 22, 2017, the disclosures of which are incorporated in their entireties by reference herein.

TECHNICAL FIELD

The present disclosure relates to the field of communication technology, and in particular, relates to an uplink data transmission method, a terminal, and a network side device.

BACKGROUND

In a communication system, the quantities of transmission antennas and reception antennas in a network side device and a terminal are generally very large. Thus, beams generated by the antennas are often relatively narrow, and a related terminal performs uplink data transmission according to a capability of the terminal. Thus, in practical applications, uplink data transmission from the terminal may easily fail. For example, when a current beam direction is blocked by an object or reception of the network side device in a relevant beam direction fails. Thus, a performance of the uplink data transmission in a related communication system is poor.

SUMMARY

An uplink data transmission method, a terminal, and a network side device are provided in the present disclosure.

In a first aspect, an uplink data transmission method is provided in the present disclosure. The method includes: receiving, by a terminal, N uplink sounding pilot indices transmitted by a network side device, wherein N is a positive integer larger than 0; and transmitting, by the terminal, uplink data to the network side device in N uplink beam directions corresponding to the N uplink sounding pilot indices.

Optionally, transmitting, by the terminal, the uplink data to the network side device in the N uplink beam directions corresponding to the N uplink sounding pilot indices, includes: in a case that N is larger than 1, transmitting, by the terminal, the uplink data to the network side device in the N uplink beam directions corresponding to the N uplink sounding pilot indices according to a transmission mode indicated explicitly or implicitly by the network side device.

Optionally, transmitting, by the terminal, the uplink data to the network side device in the N uplink beam directions corresponding to the N uplink sounding pilot indices according to the transmission mode indicated explicitly or implicitly by the network side device, includes: transmitting simultaneously, by the terminal, the uplink data to the network side device in a part or all of the N uplink beam directions corresponding to the N uplink sounding pilot indices according to a simultaneous uplink data transmission mode indicated explicitly or implicitly by the network side device.

Optionally, transmitting simultaneously, by the terminal, the uplink data to the network side device in a part or all of the N uplink beam directions corresponding to the N uplink sounding pilot indices according to the simultaneous uplink data transmission mode indicated explicitly or implicitly by the network side device, includes: transmitting simultaneously, by the terminal using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, transmitting, by the terminal, the uplink data to the network side device in the N uplink beam directions corresponding to the N uplink sounding pilot indices according to the transmission mode indicated explicitly or implicitly by the network side device, includes: transmitting in rotation, by the terminal, the uplink data to the network side device in a part or all of the N uplink beam directions corresponding to the N uplink sounding pilot indices according to a time-division transmission mode indicated explicitly or implicitly by the network side device.

Optionally, transmitting in rotation, by the terminal, the uplink data to the network side device in a part or all of the N uplink beam directions corresponding to the N uplink sounding pilot indices according to the time-division transmission mode indicated explicitly or implicitly by the network side device includes: transmitting in rotation, by the terminal, the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, transmitting in rotation, by the terminal, the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, transmitting, by the terminal, the uplink data to the network side device in the N uplink beam directions corresponding to the N uplink sounding pilot indices according to the transmission mode indicated explicitly or implicitly by the network side device, includes: selecting, by the terminal, a part of the N uplink beam directions corresponding to the N uplink sounding pilot indices according to the transmission mode indicated explicitly or implicitly by the network side device, and transmitting, by the terminal, the uplink data to the network side device in the selected part of the N uplink beam directions.

In a second aspect, an uplink data transmission method is also provided in the present disclosure. The method includes transmitting, by a network side device, N uplink sounding pilot indices to a terminal, wherein N is a positive integer larger than 0; and receiving, by the network side device, uplink data transmitted by the terminal in N uplink beam directions corresponding to the N uplink sounding pilot indices.

Optionally, receiving, by the network side device, the uplink data transmitted by the terminal in N uplink beam directions corresponding to the N uplink sounding pilot indices, includes: in a case that N is larger than 1, receiving, by the network side device, the uplink data transmitted by the terminal in the N uplink beam directions corresponding to the N uplink sounding pilot indices according to a transmission mode indicated explicitly or implicitly by the network side device.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted simultaneously by the terminal in a part or all of the N uplink beam directions corresponding to the N uplink sounding pilot indices according to a simultaneous uplink data transmission mode indicated explicitly or implicitly by the network side device.

Optionally, receiving, by the network side device, the uplink data transmitted simultaneously by the terminal in a part or all of the N uplink beam directions corresponding to the N uplink sounding pilot indices according to the simultaneous uplink data transmission mode indicated explicitly or implicitly by the network side device includes: receiving, by the network side device, the uplink data simultaneously transmitted by the terminal using a spatial multiplexing transmission manner, a port-level transmission diversity transmission manner, a beam-level transmission diversity transmission manner, a non-codebook precoding transmission manner or a single-port transmission manner in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner, wherein the spatial multiplexing transmission manner, the port-level transmission diversity transmission manner, the beam-level transmission diversity transmission manner, the non-codebook precoding transmission manner or the single-port transmission manner is explicitly or implicitly indicated by the network side device.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted in rotation by the terminal in a part or all of the N uplink beam directions corresponding to the N uplink sounding pilot indices according to a time-division transmission mode indicated explicitly or implicitly by the network side device.

Optionally, receiving, by the network side device, the uplink data transmitted in rotation by the terminal in a part or all of the N uplink beam directions corresponding to the N uplink sounding pilot indices according to the time-division transmission mode indicated explicitly or implicitly by the network side device, includes: receiving, by the network side device, the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, receiving, by the network side device, the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted by the terminal in a selected part of the N uplink beam directions, wherein the selection part of the N uplink beams directions is selected by the terminal from the N uplink beam directions corresponding to the N uplink sounding pilot indices according to the transmission mode indicated explicitly or implicitly by the network side device.

In a third aspect, a terminal is further provided in the present disclosure. The terminal includes: a reception module, configured to receive N uplink sounding pilot indices transmitted by a network side device, wherein N is a positive integer larger than 0; and a transmission module, configured to transmit uplink data to the network side device in N uplink beam directions corresponding to the N uplink sounding pilot indices.

Optionally, the transmission module is configured to: in a case that N is larger than 1, transmit the uplink data to the network side device in the N uplink beam directions corresponding to the N uplink sounding pilot indices according to a transmission mode indicated explicitly or implicitly by the network side device.

Optionally, the transmission module is configured to: transmit simultaneously the uplink data to the network side device in a part or all of the N uplink beam directions corresponding to the N uplink sounding pilot indices according to a simultaneous uplink data transmission mode indicated explicitly or implicitly by the network side device.

Optionally, the transmission module is configured to: transmit simultaneously, using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, the transmission module is configured to: transmit in rotation the uplink data to the network side device in a part or all of the N uplink beam directions corresponding to the N uplink sounding pilot indices according to a time-division transmission mode indicated explicitly or implicitly by the network side device.

Optionally, the transmission module is configured to transmit in rotation the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, the transmission module is configured to transmit in rotation the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, the transmission module is configured to: select a part of the N uplink beam directions corresponding to the N uplink sounding pilot indices according to the transmission mode indicated explicitly or implicitly by the network side device, and transmit the uplink data to the network side device in the selected part of the N uplink beam directions.

In a fourth aspect, a network side device is further provided in the present disclosure. The network side device includes a transmission module, configured to transmit N uplink sounding pilot indices to a terminal, wherein N is a positive integer larger than 0; a reception module, configured to receive uplink data transmitted by the terminal in N uplink beam directions corresponding to the N uplink sounding pilot indices.

Optionally, the reception module is configured to: in a case that N is larger than 1, receive the uplink data transmitted by the terminal in the N uplink beam directions corresponding to the N uplink sounding pilot indices according to a transmission mode indicated explicitly or implicitly by the network side device.

Optionally, the reception module is configured to: receive the uplink data transmitted simultaneously by the terminal in a part or all of the N uplink beam directions corresponding to the N uplink sounding pilot indices according to a simultaneous uplink data transmission mode indicated explicitly or implicitly by the network side device.

Optionally, the reception module is configured to: receive the uplink data simultaneously transmitted by the terminal using a spatial multiplexing transmission manner, a port-level transmission diversity transmission manner, a beam-level transmission diversity transmission manner, a non-codebook precoding transmission manner or a single-port transmission manner in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner, wherein the spatial multiplexing transmission manner, the port-level transmission diversity transmission manner, the beam-level transmission diversity transmission manner, the non-codebook precoding transmission manner or the single-port transmission manner is explicitly or implicitly indicated by the network side device.

Optionally, the reception module is configured to: receive the uplink data transmitted in rotation by the terminal in a part or all of the N uplink beam directions corresponding to the N uplink sounding pilot indices according to a time-division transmission mode indicated explicitly or implicitly by the network side device.

Optionally, the reception module is configured to receive the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, the reception module is configured to receive the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, the reception module is configured to: receive the uplink data transmitted by the terminal in a selected part of the N uplink beam directions corresponding to the N uplink sounding pilot indices, wherein the selection part of the N uplink beams directions is selected by the terminal from the N uplink beam directions according to the transmission mode indicated explicitly or implicitly by the network side device.

In a fifth aspect, a terminal is provided in the present disclosure. The terminal includes a first processor, a first transceiver, a first storage, a first user interface, and a bus interface, wherein, the first processor is configured to read programs in the first storage to perform steps in the uplink data transmission method according to the first aspect.

In a sixth aspect, a network side device is provided in the present disclosure. The network side device includes a second processor, a second transceiver, a second storage, a second user interface and a bus interface, wherein the second processor is configured to read programs in the second storage to perform steps in the uplink data transmission method according to the second aspect.

In a seventh aspect, a non-volatile storage medium is provided in the present disclosure. The non-volatile storage medium includes a program and instructions stored on the non-volatile storage medium, wherein when the program and instructions are executed by a processor, the processor executes steps in the uplink data transmission method according to the first aspect.

In an eighth aspect, a non-volatile storage medium is provided in the present disclosure. The non-volatile storage medium includes a program and instructions stored on the non-volatile storage medium, wherein when the program and instructions are executed by a processor, the processor executes steps in the uplink data transmission method according to the second aspect.

The above technical solutions of the present disclosure have at least the following beneficial effects. The terminal receives N uplink sounding pilot indices transmitted by a network side device, wherein N is a positive integer larger than 0; and transmits uplink data to the network side device in N uplink beam directions corresponding to the N uplink sounding pilot indices. In this way, the terminal may perform uplink data transmission according to an instruction from the network side device, and the present disclosure may improve transmission performance of uplink data as compared with the related art in which terminal performs uplink data transmission based on a capability of the terminal.

DETAILED DESCRIPTION

In order to make technical problems, technical solutions and advantages to be solved by the present disclosure clearer, detailed description will be made with reference to the accompanying drawings and specific embodiments below.

Figures 1, 2:
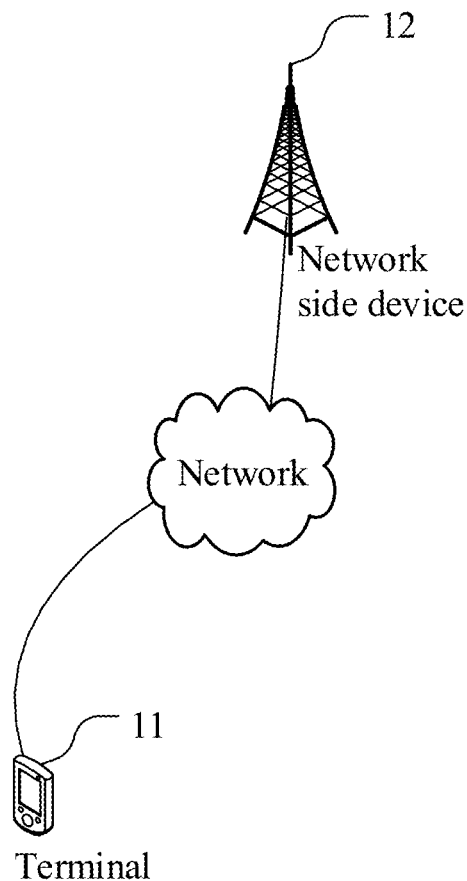
FIG. 1 is a schematic diagram of a network infrastructure to which the present disclosure is applicable.
FIG. 2 is a flow chart of an uplink data transmission method provided by the present disclosure.

Referring to FIG. 1, FIG. 1 is a schematic diagram of a network infrastructure to which the present disclosure is applicable. As shown in FIG. 1, the network infrastructure includes a terminal 11 and a network side device 12. The terminal 11 may be a terminal side device such as a mobile phone, a Tablet Personal Computer, a Laptop Computer, a Personal Digital Assistant (PDA), a Mobile Internet Device (MID) or a Wearable Device. It should be noted that, the present disclosure is not limited to a specific type of the terminal 11. The terminal 11 may establish communication with the network side device 12, wherein a network in FIG. 1 may indicate that the terminal 11 establishes wireless communication with the network side device 12. The network side device 12 may be an evolved Node B (eNB) or other base stations, or may be a network side device such as an access point device, and it should be noted that the present disclosure is not limited to a specific type of network side device 12.

Referring to FIG. 2, FIG. 2 is a flow chart of an uplink data transmission method provided by the present disclosure. As shown in FIG. 2, the uplink data transmission method includes the following steps 201-202.

Step 201: receiving, by a terminal, N uplink sounding pilot indices transmitted by a network side device, wherein N is a positive integer larger than 0.

Step 202: transmitting, by the terminal, uplink data to the network side device in N uplink beam directions corresponding to the N uplink sounding pilot indices.

In the present disclosure, an uplink sounding pilot index (the uplink sounding pilot index includes a SRS (Sounding Reference Signal) resource indicator (SRI)) may correspond to an uplink beam direction, that is, one uplink sounding pilot index is used to correspond to or index an uplink beam direction. After the terminal receives the uplink sounding pilot index, the terminal may determine the uplink beam direction corresponding to the uplink sounding pilot index. For example, the terminal stores corresponding relations between uplink sounding pilot indices and uplink beam directions in advance, or an uplink sounding pilot index includes indication information (such as an identifier) for indicating the uplink beam direction corresponding to the uplink sounding pilot index. In addition, the N uplink sounding pilot indices correspond to different uplink beam directions.

After the terminal receives the N uplink sounding pilot indices, the terminal may determine the N uplink beam directions so as to transmit uplink data to the network side device in the N uplink beam directions. Of course, the uplink data may be transmitted in some or all of the N uplink beam directions. A direction of an uplink beam may be one uplink beam, that is, the step 202 may use N uplink beams to transmit uplink data to the network side device. The uplink data transmitted in the step 202 in each of the uplink beam directions may be the same or different, and may be transmitted in N uplink beam directions simultaneously or in a time-division manner, which is not limited to the present disclosure.

Figure 3:
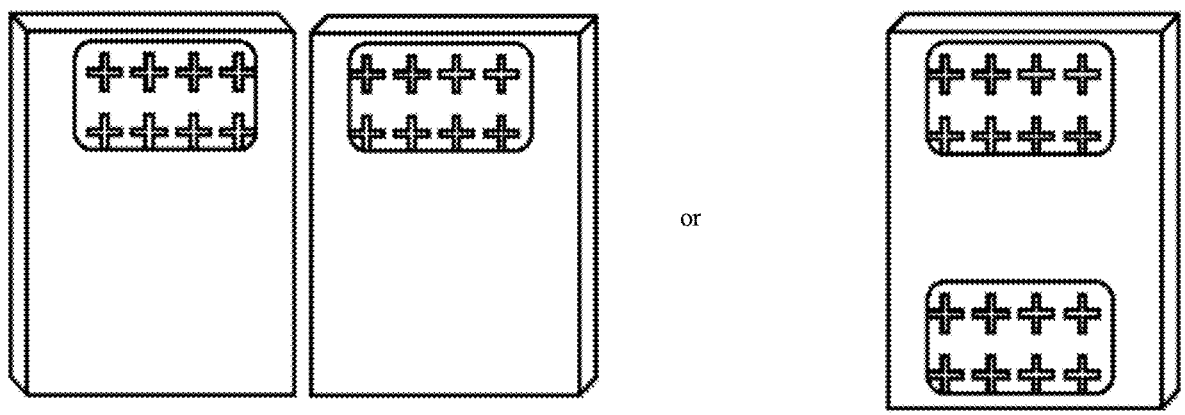
FIG. 3 is a schematic structural diagram of an antenna module of a terminal provided by the present disclosure.

Through the above step, the terminal may transmit uplink data based on uplink sounding pilot indices from the network side device, thereby improving performance and robustness of uplink data transmission, and because the uplink data is transmitted according to an instruction from the network side device, a failure probability of the uplink data transmission may be reduced, wherein improving the performance and the robustness of uplink data transmission may be understood as improving the performance and the robustness of an uplink data channel. In addition, in the present disclosure, the terminal may be the terminal shown in FIG. 1, and the terminal may include one or more antenna modules, for example, the terminal may include a plurality of antenna modules shown in FIG. 3.

Optionally, transmitting, by the terminal, uplink data to the network side device in N uplink beam directions corresponding to the N uplink sounding pilot indices, includes: in a case that N is larger than 1, transmitting, by the terminal, the uplink data to the network side device in the N uplink beam directions corresponding to the N uplink sounding pilot indices according to a transmission mode indicated explicitly or implicitly by the network side device.

The transmission mode indicated explicitly by the network side device may be a transmission mode indicated to the terminal by the network side device through signaling transmission. For example, the network side device transmits an indication signaling for indicating the transmission mode to the terminal, or a message transmitted from the network side device to the terminal carries information for indicating the transmission mode. For example, a message including the N uplink sounding pilot indices transmitted by the network side device carries information about the transmission mode. The transmission mode indicated implicitly may be preconfigured to the terminal by the network side device, or may be a transmission mode pre-negotiated with the terminal and used for transmission under a specific scene, or may be implicitly indicated to the terminal by the network side device through a specific message, and the present disclosure is not limited thereto.

In the embodiment, in a case that the network side device indicates a plurality of uplink sounding pilot indices, the terminal performs transmission in a plurality of uplink beam directions according to the transmission mode explicitly or implicitly indicated by the network side device, in order to further improve uplink data transmission performance. Of course, in the present disclosure, the transmission mode for transmitting uplink data in a plurality of uplink beam directions may also be determined by the terminal, and the present disclosure is not limited thereto.

Optionally, transmitting, by the terminal, the uplink data to the network side device in the N uplink beam directions corresponding to the N uplink sounding pilot indices according to a transmission mode indicated explicitly or implicitly by the network side device, includes: transmitting simultaneously, by the terminal, the uplink data to the network side device in a part or all of the N uplink beam directions corresponding to the N uplink sounding pilot indices according to a simultaneous uplink data transmission mode indicated explicitly or implicitly by the network side device.

In this embodiment, the uplink data may be simultaneously transmitted to the network side device in the N uplink beam directions, thereby further improving the performance of the uplink data transmission. In addition, in the present disclosure, the part or all of the N uplink beam directions may be autonomously selected according to a capability of the terminal or according to a service requirement or a scenario, or may be configured explicitly or implicitly by the network side device. The present disclosure is not limited thereto.

Optionally, transmitting simultaneously, by the terminal, the uplink data to the network side device in a part or all of the N uplink beam directions corresponding to the N uplink sounding pilot indices according to a simultaneous uplink data transmission mode indicated explicitly or implicitly by the network side device, includes: transmitting simultaneously, by the terminal using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner explicitly or implicitly indicated by the network side device.

In this embodiment, the terminal may simultaneously transmit the uplink data to the network side device by using the spatial multiplexing transmission manner, the port-level transmission diversity transmission manner, the beam-level transmission diversity transmission manner, the non-codebook precoding transmission manner or the single-port transmission manner in the N uplink beam directions, thereby improving transmission performance of the uplink data. The spatial multiplexing transmission manner may be a manner in which uplink data is transmitted simultaneously in a spatial multiplexing manner in the N uplink beam directions. The port-level transmission diversity transmission manner may be a manner in which diversity transmission is performed simultaneously by using multiple ports. The beam-level transmission diversity transmission manner may be a manner in which diversity transmission is performed simultaneously by using multiple beams. The non-codebook precoding transmission manner may be a manner in which coded transmission is performed by using a precoding determined by the terminal, i.e., the network side device does not configure a precoding to the terminal. The single-port transmission manner may be a manner in which uplink data is transmitted simultaneously in N uplink beam directions on a port.

Optionally, transmitting, by the terminal, the uplink data to the network side device in the N uplink beam directions corresponding to the N uplink sounding pilot indices according to the transmission mode indicated explicitly or implicitly by the network side device, includes: transmitting in rotation, by the terminal, the uplink data to the network side device in a part or all of the N uplink beam directions corresponding to the N uplink sounding pilot indices according to a time-division transmission mode indicated explicitly or implicitly by the network side device.

The time-division transmission mode may be understood as a transmission mode in which uplink data is not transmitted simultaneously in the N uplink beam directions. Transmitting the uplink data to the network side device in rotation may be transmitting in rotation in units of time resources or transmitting in rotation in units of specific transmission times, and the present disclosure is not limited thereto. In this embodiment, uplink data may be transmitting in rotation to the network side device in the N uplink beam directions so as to improve the transmission performance of the uplink data.

Optionally, transmitting in rotation, by the terminal, the uplink data to the network side device in a part or all of the N uplink beam directions corresponding to the N uplink sounding pilot indices according to a time-division transmission mode indicated explicitly or implicitly by the network side device includes: transmitting in rotation, by the terminal, the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, transmitting in rotation, by the terminal, the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Figure 4:
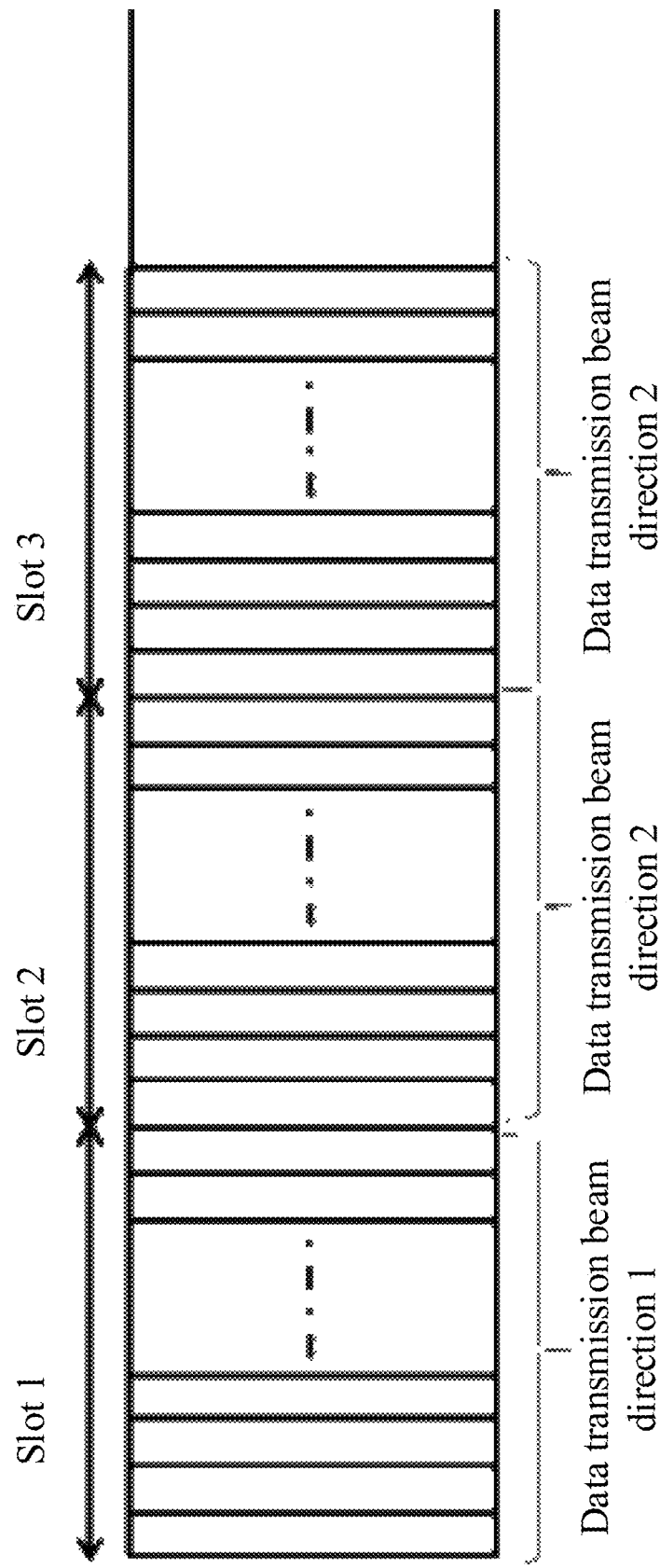
FIG. 4 is a schematic diagram of uplink data transmission of a terminal provided by the present disclosure.

Transmitting in rotation, by the terminal, the uplink data to the network side device in units of time slots or in units of subframes may be understood as performing switching transmission of uplink beam directions at a time-slot level or at a subframe level. That is, switching of uplink beam directions is performed in units of time slots or in units of subframes. In this embodiment, the terminal may transmit uplink data in the same uplink beam direction in one time slot or in one subframe. When the next time slot or the next subframe is reached, the uplink data is transmitted in another uplink beam direction, and the uplink data transmitted in different uplink beam directions may be the same or different. For example, as shown in FIG. 4, the terminal transmits uplink data in a first uplink beam direction in a first time slot or in a first subframe, and transmits uplink data in a second uplink beam direction in a second time slot or in a second subframe, and transmits the uplink data in the first uplink beam direction in a third time slot or in a third subframe.

Figure 5:
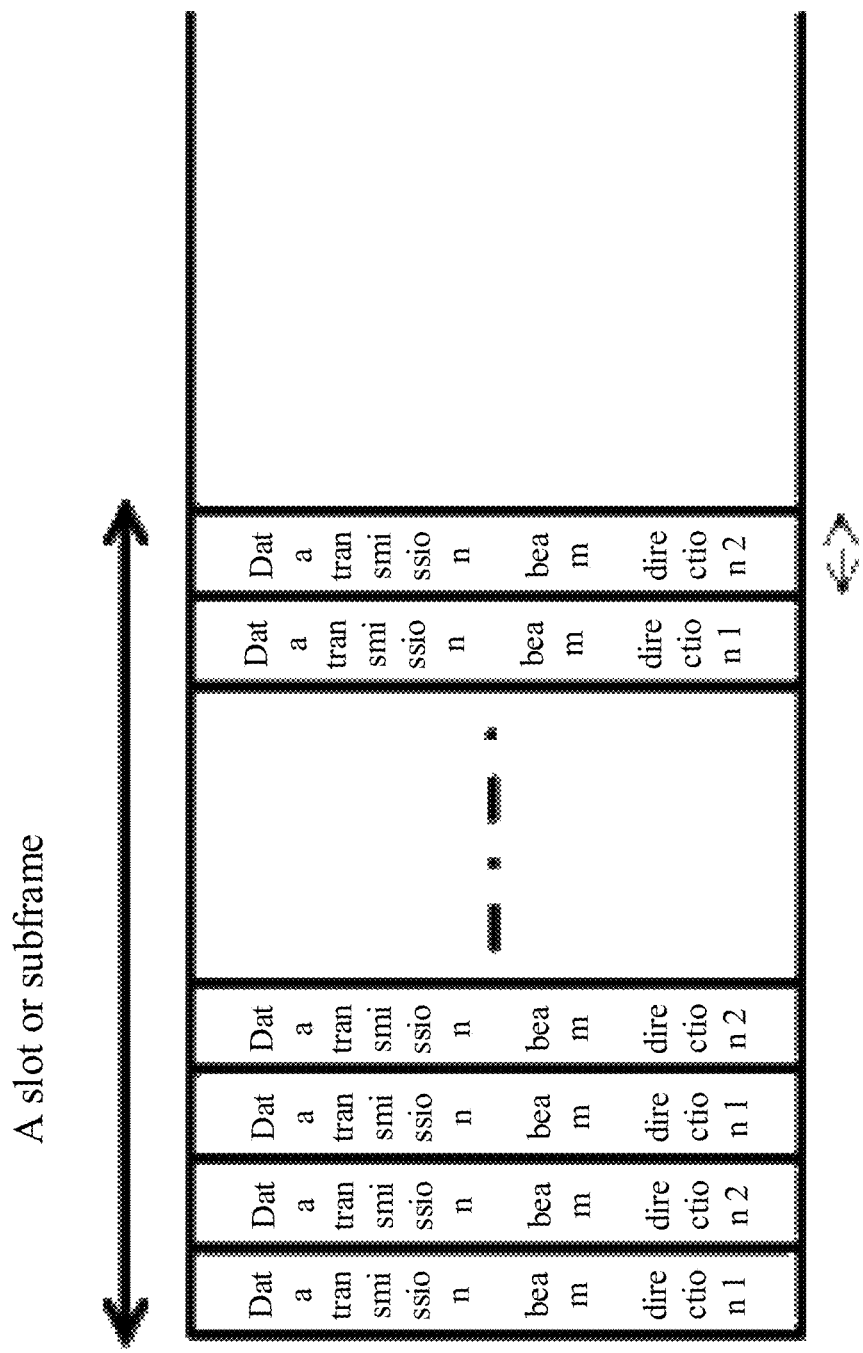
FIG. 5 is a schematic diagram of uplink data transmission of a terminal provided by the present disclosure.

The symbols may be Orthogonal Frequency Division Multiplexing (OFDM) symbols or Discrete Fourier Transform Spread OFDM (DFT-S-OFDM) symbols. Transmitting the uplink data to the network side device in rotation in units of symbols may be understood as switching transmission of uplink beam directions in a symbol level, that is, switching of uplink beam directions is performed in units of symbols. For example, as shown in FIG. 5, uplink data is transmitted in a first uplink beam direction in a first symbol in a time slot or a subframe; uplink data is transmitted in a second uplink beam direction in a second symbol in the time slot or the subframe; uplink data is transmitted in the first uplink beam direction in a third symbol in the time slot or the subframe; and uplink data is transmitted in the second uplink beam direction in a fourth symbol in the time slot or the subframe; and so on.

In this embodiment, transmission may be performed in rotation in units of time slots, in units of subframes or in units of symbols, that is, the transmission performance of uplink data may be improved, and the transmission of uplink data may also be adapted to different transmission scenarios, so as to improve the overall performance of the communication system.

Optionally, transmitting, by the terminal, the uplink data to the network side device in the N uplink beam directions corresponding to the N uplink sounding pilot indices according to the transmission mode indicated explicitly or implicitly by the network side device, includes: selecting, by the terminal, a part of the N uplink beam directions corresponding to the N uplink sounding pilot indices according to the transmission mode indicated explicitly or implicitly by the network side device, and transmitting, by the terminal, the uplink data to the network side device in a selected part of the N uplink beam directions.

In this embodiment, when the network side device indicates the plurality of uplink sounding pilot indices, the terminal may select a specific uplink beam direction according to the indication indicated explicitly or implicitly by the network side device, and transmit uplink data to the network side device in the selected uplink beam direction. The selection uplink beam direction may also be a specific beam direction explicitly or implicitly indicated by the network side device, or may be a specific beam direction selected by the terminal at discretion of the terminal, and the present disclosure is not limited thereto. In this embodiment, since the terminal may select a part of the uplink beam directions to transmit the uplink data, flexibility of a system may be improved so as to meet needs of different scenarios or services. The part of the beam directions may be one beam direction, that is, the transmission mode may be a single-beam transmission mode; or when N is larger than 1, the part of the beam directions may be K beam directions, wherein K is larger than 1 and less than N.

In the present disclosure, the terminal receives the N uplink sounding pilot indices transmitted by the network side device, wherein N is a positive integer larger than 0; the terminal transmits uplink data to the network side device in N uplink beam directions corresponding to the N uplink sounding pilot indices. In this way, the terminal may perform uplink data transmission according to an instruction from the network side device, and the present disclosure may improve the transmission performance of uplink data as compared with the related art in which the terminal performs uplink data transmission according to the capability of the terminal.

Figure 6:
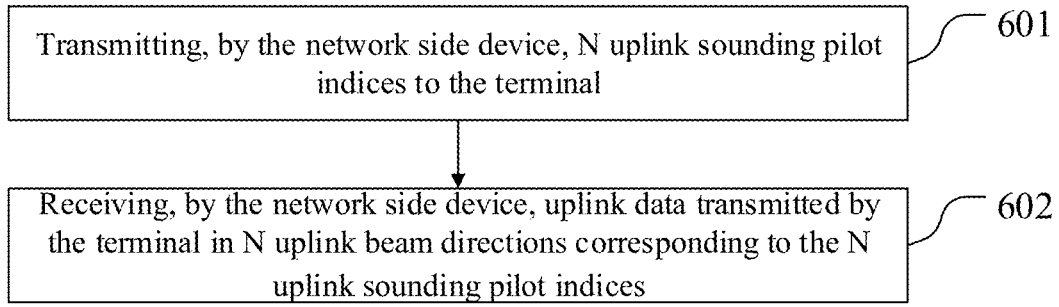
FIG. 6 is a flow chart of an uplink data transmission method provided by the present disclosure.

Referring to FIG. 6, FIG. 6 is a flowchart of an uplink data transmission method provided in the present disclosure. The uplink data transmission method includes following steps 601-602.

Step 601: transmitting, by the network side device, N uplink sounding pilot indices to the terminal, wherein N is a positive integer larger than 0.

Step 602: receiving, by the network side device, uplink data transmitted by the terminal in N uplink beam directions corresponding to the N uplink sounding pilot indices.

Optionally, receiving, by the network side device, uplink data transmitted by the terminal in N uplink beam directions corresponding to the N uplink sounding pilot indices, includes: in a case that N is larger than 1, receiving, by the network side device, the uplink data transmitted by the terminal in the N uplink beam directions corresponding to the N uplink sounding pilot indices according to a transmission mode indicated explicitly or implicitly by the network side device.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted simultaneously by the terminal in a part or all of the N uplink beam directions corresponding to the N uplink sounding pilot indices according to a simultaneous uplink data transmission mode indicated explicitly or implicitly by the network side device.

Optionally, receiving, by the network side device, the uplink data transmitted simultaneously by the terminal in a part or all of the N uplink beam directions corresponding to the N uplink sounding pilot indices according to a simultaneous uplink data transmission mode indicated explicitly or implicitly by the network side device includes: receiving, by the network side device, the uplink data simultaneously transmitted by the terminal using the spatial multiplexing transmission manner, the port-level transmission diversity transmission manner, the beam-level transmission diversity transmission manner, the non-codebook precoding transmission manner or the single-port transmission manner explicitly or implicitly indicated by the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted in rotation by the terminal in a part or all of the N uplink beam directions corresponding to the N uplink sounding pilot indices according to a time-division transmission mode indicated explicitly or implicitly by the network side device.

Optionally, receiving, by the network side device, the uplink data transmitted in rotation by the terminal in a part or all of the N uplink beam directions corresponding to the N uplink sounding pilot indices according to a time-division transmission mode indicated explicitly or implicitly by the network side device, includes: receiving, by the network side device, the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, receiving, by the network side device, the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, receiving, by the network side device, the uplink data transmitted by the terminal in the N uplink beam directions corresponding to the N uplink sounding pilot indices according to the transmission mode indicated explicitly or implicitly by the network side device, includes: receiving, by the network side device, the uplink data transmitted by the terminal in a selected part of the N uplink beam directions, wherein the selection part of the N uplink beams directions are selected by the terminal from the N uplink beam directions corresponding to the N uplink sounding pilot indices according to the transmission mode indicated explicitly or implicitly by the network side device.

It should be noted that this embodiment is an embodiment at a network side device corresponding to the embodiment shown in FIG. 2, and specific implementation of this embodiment may be obtained by referring to related descriptions of the embodiment shown in FIG. 2. In order to avoid repetition of the description, the related descriptions will not be described again in this embodiment, and the same beneficial effect may be achieved.

Figure 7:
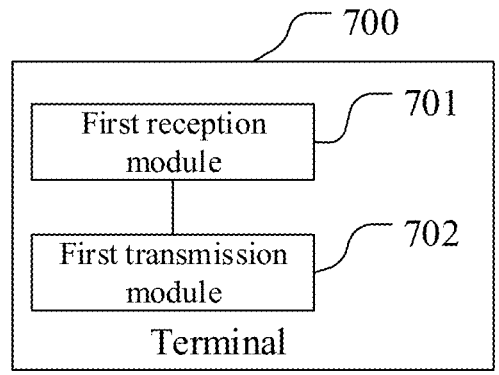
FIG. 7 is a schematic structural diagram of a terminal provided by the present disclosure.

Referring to FIG. 7, FIG. 7 is a schematic structural diagram of a terminal provided in the present disclosure. The terminal 700 includes a first reception module 701 and a first transmission module 702. The first reception module 701 is configured to receive N uplink sounding pilot indices transmitted by a network side device, wherein N is a positive integer larger than 0. The first transmission module 702 is configured to transmit uplink data to the network side device in N uplink beam directions corresponding to the N uplink sounding pilot indices.

Optionally, the first transmission module 702 is configured to: in a case that N is larger than 1, transmit the uplink data to the network side device in the N uplink beam directions corresponding to the N uplink sounding pilot indices according to a transmission mode indicated explicitly or implicitly by the network side device.

Optionally, the first transmission module 702 is configured to: transmit simultaneously the uplink data to the network side device in a part or all of the N uplink beam directions corresponding to the N uplink sounding pilot indices according to a simultaneous uplink data transmission mode indicated explicitly or implicitly by the network side device.

Optionally, the first transmission module 702 is configured to transmit simultaneously, using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, the first transmission module 702 is configured to transmit in rotation the uplink data to the network side device in a part or all of the N uplink beam directions corresponding to the N uplink sounding pilot indices according to a time-division transmission mode indicated explicitly or implicitly by the network side device.

Optionally, the first transmission module 702 is configured to transmit in rotation the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, the first transmission module 702 is configured to transmit in rotation the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, the first transmission module 702 is configured to select a part of the N uplink beam directions corresponding to the N uplink sounding pilot indices according to the transmission mode indicated explicitly or implicitly by the network side device, and transmit the uplink data to the network side device in a selected part of the N uplink beam directions.

It should be noted that the terminal 700 in this embodiment may be a terminal in any of process embodiments in the present disclosure, and any implementation of the terminal in the process embodiments of the present disclosure may be implemented by the terminal 700 in the present embodiment, and the same advantageous effects may be achieved, which will not be described in the embodiment.

Figure 8:
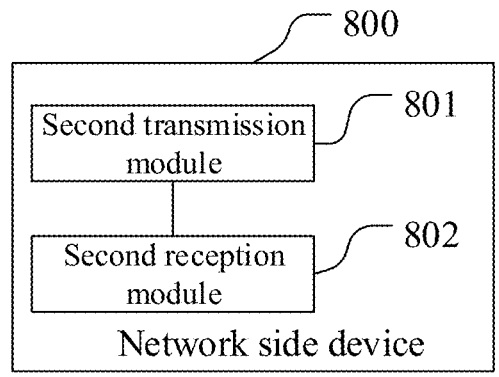
FIG. 8 is a schematic structural diagram of a network side device provided by the present disclosure.

Referring to FIG. 8, FIG. 8 is a schematic structural diagram of a network side device provided in the present disclosure. The network side device 800 includes a second transmission module 801 and a second reception module 802. The second transmission module 801 is configured to transmit N uplink sounding pilot indices to a terminal, wherein N is a positive integer larger than 0. The second reception module 802 is configured to receive uplink data transmitted by the terminal in N uplink beam directions corresponding to the N uplink sounding pilot indices.

Optionally, the second reception module 802 is configured to: in a case that N is larger than 1, receive the uplink data transmitted by the terminal in the N uplink beam directions corresponding to the N uplink sounding pilot indices according to a transmission mode indicated explicitly or implicitly by the network side device.

Optionally, the second reception module 802 is configured to: receive the uplink data transmitted simultaneously by the terminal in a part or all of the N uplink beam directions corresponding to the N uplink sounding pilot indices according to a simultaneous uplink data transmission mode indicated explicitly or implicitly by the network side device.

Optionally, the second reception module 802 is configured to: receive the uplink data simultaneously transmitted by the terminal using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, the second reception module 802 is configured to: receive the uplink data transmitted in rotation by the terminal in a part or all of the N uplink beam directions corresponding to the N uplink sounding pilot indices according to a time-division transmission mode indicated explicitly or implicitly by the network side device.

Optionally, the second reception module 802 is configured to: receive the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, the second reception module 802 is configured to receive the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, the second reception module 802 is configured to: receive the uplink data transmitted by the terminal in a selected part of the N uplink beam directions, wherein the selection part of the N uplink beams directions are selected by the terminal from the N uplink beam directions corresponding to the N uplink sounding pilot indices according to the transmission mode indicated explicitly or implicitly by the network side device.

Optionally, the second reception module 802 is configured to receive the transmission mode indicated explicitly or implicitly by the network device, and select a partial beam direction among N uplink beam directions corresponding to the N uplink sounding pilot indexes, And transmits the uplink data in the selected partial beam direction.

It should be noted that the network side device 800 in this embodiment may be a network side device in any of process embodiments in the present disclosure, and any implementation of the network side device in the process embodiments of the present disclosure may be implemented by the network side device 800 in the present embodiment, and the same advantageous effects may be achieved, which will not be described in the embodiment.

Figure 9:
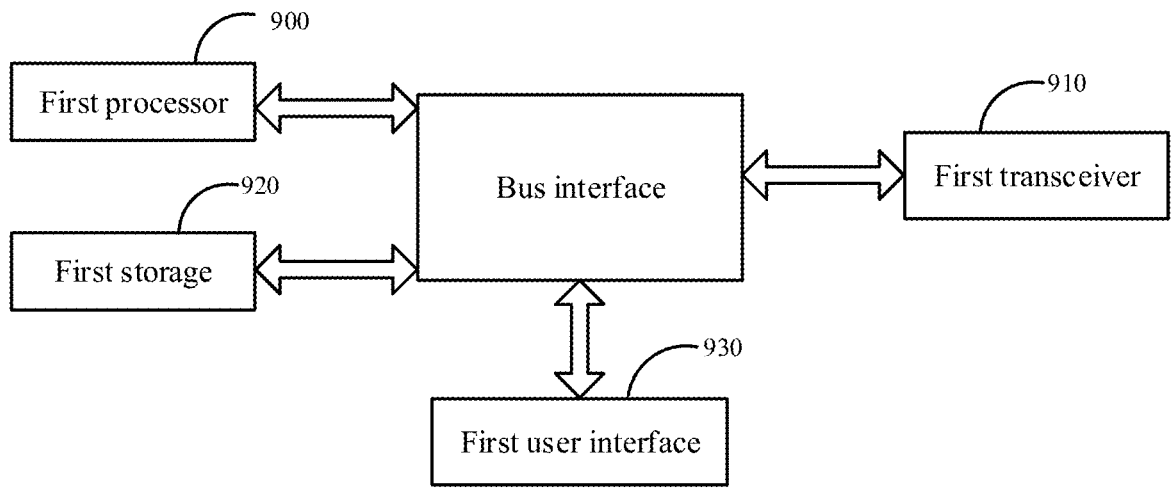
FIG. 9 is a schematic structural diagram of a terminal provided by the present disclosure.

Refer to FIG. 9, FIG. 9 is a schematic structural diagram of a terminal provided in the present disclosure. The terminal includes a first processor 900, a first transceiver 910, a first storage 920, a first user interface 930, and a bus interface. The first processor 900 is configured to read programs in the first storage 920 to perform following steps: receiving, through the first transceiver 910, N uplink sounding pilot indices transmitted by a network side device, wherein N is a positive integer larger than 0; and transmitting, through the first transceiver 910, uplink data to the network side device in N uplink beam directions corresponding to the N uplink sounding pilot indices.

The first transceiver 910 is configured to receive and transmit data under a control of the first processor 900.

In FIG. 9, a bus architecture may include any number of interconnected first buses and bridges. Specifically, one or more processors such as the first processor 900 and a storage such as the first storage 920 are linked together. The bus architecture may also link together various other circuits such as peripheral devices, voltage regulators, and power management circuits, etc., which are well known in the art and therefore will not be further described herein. The bus interface provides an interface. The first transceiver 910 may be one or more elements such as a plurality of transmitters and a plurality of receivers, configured to provide units for communicating with various other devices over a transmission medium. For different user devices, the first user interface 930 may also be an interface capable of interfacing with internal or external necessary devices including, but not limited to, a keypad, a display, a speaker, a microphone, a joystick, and the like.

The first processor 900 is responsible for managing the bus architecture and general processing, and the first storage 920 may store data used by the first processor 900 when the first processor 900 performs operations.

Optionally, transmitting uplink data to the network side device in N uplink beam directions corresponding to the N uplink sounding pilot indices, includes: in a case that N is larger than 1, transmitting the uplink data to the network side device in the N uplink beam directions corresponding to the N uplink sounding pilot indices according to a transmission mode indicated explicitly or implicitly by the network side device.

Optionally, transmitting the uplink data to the network side device in the N uplink beam directions corresponding to the N uplink sounding pilot indices according to a transmission mode indicated explicitly or implicitly by the network side device, includes: transmitting simultaneously the uplink data to the network side device in a part or all of the N uplink beam directions corresponding to the N uplink sounding pilot indices according to a simultaneous uplink data transmission mode indicated explicitly or implicitly by the network side device.

Optionally, transmitting simultaneously the uplink data to the network side device in a part or all of the N uplink beam directions corresponding to the N uplink sounding pilot indices according to a simultaneous uplink data transmission mode indicated explicitly or implicitly by the network side device, includes: transmitting simultaneously, using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, transmitting the uplink data to the network side device in the N uplink beam directions corresponding to the N uplink sounding pilot indices according to the transmission mode indicated explicitly or implicitly by the network side device, includes: transmitting in rotation the uplink data to the network side device in a part or all of the N uplink beam directions corresponding to the N uplink sounding pilot indices according to a time-division transmission mode indicated explicitly or implicitly by the network side device.

Optionally, transmitting in rotation the uplink data to the network side device in a part or all of the N uplink beam directions corresponding to the N uplink sounding pilot indices according to a time-division transmission mode indicated explicitly or implicitly by the network side device includes: transmitting in rotation the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, transmitting in rotation the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, transmitting the uplink data to the network side device in the N uplink beam directions corresponding to the N uplink sounding pilot indices according to the transmission mode indicated explicitly or implicitly by the network side device, includes: selecting a part of the N uplink beam directions corresponding to the N uplink sounding pilot indices according to the transmission mode indicated explicitly or implicitly by the network side device, and transmitting the uplink data to the network side device in a selected part of the N uplink beam directions.

It should be noted that the terminal in this embodiment may be a terminal in any of process embodiments shown in FIG. 1 to FIG. 6 in the present disclosure, and any implementation of the terminal in the process embodiments in FIG. 1 to FIG. 6 in the present disclosure may be implemented by the terminal in the present embodiment, and the same advantageous effects may be achieved, which will not be described in the embodiment.

Figure 10:
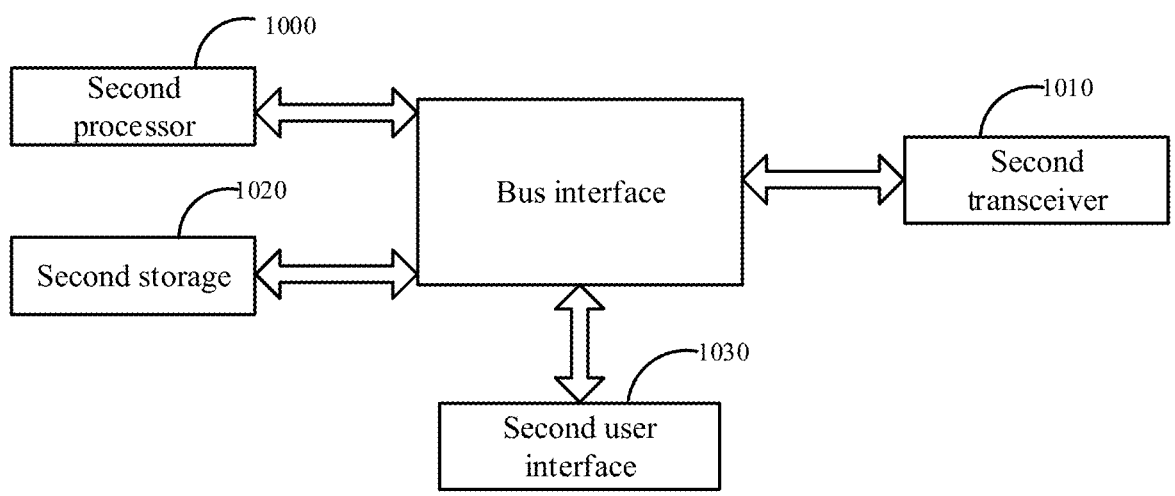
FIG. 10 is a schematic structural diagram of a network side device provided by the present disclosure.

Refer to FIG. 10, FIG. 10 is a schematic structural diagram of a network side device provided in the present disclosure. The network side device includes a second processor 1000, a second transceiver 1010, a second storage 1020, a second user interface 1030, and a bus interface. The second processor 1000 is configured to read programs in the second storage 1020 to perform following steps: transmitting, through the second transceiver 1010, N uplink sounding pilot indices to the terminal, wherein N is a positive integer larger than 0; and receiving, through the second transceiver 1010, uplink data transmitted by the terminal in N uplink beam directions corresponding to the N uplink sounding pilot indices.

The second transceiver 1010 is configured to receive and transmit data under a control of the second processor 1000.

In FIG. 10, a bus architecture may include any number of interconnected first buses and bridges. Specifically, one or more processors such as the second processor 1000 and a storage such as the second storage 1020 are linked together. The bus architecture may also link together various other circuits such as peripheral devices, voltage regulators, and power management circuits, etc., which are well known in the art and therefore will not be further described herein. The bus interface provides an interface. The second transceiver 1010 may be one or more elements such as a plurality of transmitters and a plurality of receivers, configured to provide units for communicating with various other devices over a transmission medium. For different user devices, the second user interface 1030 may also be an interface capable of interfacing with internal or external necessary devices including, but not limited to, a keypad, a display, a speaker, a microphone, a joystick, and the like.

The second processor 1000 is responsible for managing the bus architecture and general processing, and the second storage 1020 may store data used by the second processor 1000 when the second processor 1000 performs operations.

Optionally, receiving uplink data transmitted by the terminal in N uplink beam directions corresponding to the N uplink sounding pilot indices, includes: in a case that N is larger than 1, receiving the uplink data transmitted by the terminal in the N uplink beam directions corresponding to the N uplink sounding pilot indices according to a transmission mode indicated explicitly or implicitly by the network side device.

Optionally, receiving the uplink data transmitted by the terminal in the N uplink beam directions corresponding to the N uplink sounding pilot indices according to the transmission mode indicated explicitly or implicitly by the network side device, includes: receiving the uplink data transmitted simultaneously by the terminal in a part or all of the N uplink beam directions corresponding to the N uplink sounding pilot indices according to a simultaneous uplink data transmission mode indicated explicitly or implicitly by the network side device.

Optionally, receiving the uplink data transmitted simultaneously by the terminal in a part or all of the N uplink beam directions corresponding to the N uplink sounding pilot indices according to a simultaneous uplink data transmission mode indicated explicitly or implicitly by the network side device, includes: receiving the uplink data simultaneously transmitted by the terminal using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner.

Optionally, receiving the uplink data transmitted by the terminal in the N uplink beam directions corresponding to the N uplink sounding pilot indices according to the transmission mode indicated explicitly or implicitly by the network side device, includes: receiving the uplink data transmitted in rotation by the terminal in a part or all of the N uplink beam directions corresponding to the N uplink sounding pilot indices according to a time-division transmission mode indicated explicitly or implicitly by the network side device.

Optionally, receiving, the uplink data transmitted in rotation by the terminal in a part or all of the N uplink beam directions corresponding to the N uplink sounding pilot indices according to a time-division transmission mode indicated explicitly or implicitly by the network side device, includes: receiving the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, receiving the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

Optionally, receiving the uplink data transmitted by the terminal in the N uplink beam directions corresponding to the N uplink sounding pilot indices according to the transmission mode indicated explicitly or implicitly by the network side device, includes: receiving the uplink data transmitted by the terminal in a selected part of the N uplink beams directions, wherein the selection part of the N uplink beams directions are selected by the terminal from the N uplink beam directions corresponding to the N uplink sounding pilot indices according to the transmission mode indicated explicitly or implicitly by the network side device.

It should be noted that the network side device in this embodiment may be a network side device in any of process embodiments shown in FIG. 1 to FIG. 6 in the present disclosure, and any implementation of the network side device in the process embodiments in FIG. 1 to FIG. 6 in the present disclosure may be implemented by the network side device in the present embodiment, and the same advantageous effects may be achieved, which will not be described in the embodiment.

In several embodiments provided in the present disclosure, it should be understood that the disclosed method and device may be implemented in other ways. For example, the device embodiments described above are merely illustrative. For example, a division to units is only a logical function division and may be implemented in another division manner. For example, multiple units or components may be combined or integrated into another system, or some features may be ignored, or not be performed. Optionally, a coupling or a direct coupling or a communication connection shown or discussed between units displayed or discussed may be an indirect coupling or an indirect communication connection through some interfaces, devices or units, and may be electrical coupling or connections, mechanical coupling or connections, or other forms of coupling or connections.

In addition, various functional units in the embodiments of the present disclosure may be integrated in one processing unit, or may be separately physically included in multiple processing units, or two or more of the functional units may be integrated in one unit. The units may be realized either in the form of hardware or in the form of hardware function units plus software function units.

The units described above in the form of software functional units may be stored in a computer readable storage medium. The above-described software functional units are stored in a storage medium. The storage medium includes multiple instructions for causing a computer device (which may be a personal computer, a server, or a network device, etc.) to perform part of the steps of the method at a transmitting end or at the receiving end according to various embodiments of the present disclosure. The storage medium may be any of a variety of media, such as RAM, a Flash Memory, a mobile hard disk, a Read-Only Memory (ROM), a Random Access Memory (RAM), a magnetic disk, or a Compact Disk, that may store program codes.

The foregoing are optional embodiments of the present disclosure and it should be noted that various modifications and refinements may be made by those of ordinary skills in the art without departing from the principles of the present disclosure. These improvements and refinements should also be considered to be within the scope of the present disclosure.

What is claimed is:

1. An uplink data transmission method, comprising:

receiving, by a terminal, N uplink sounding pilot indices transmitted by a network side device, wherein N is a positive integer larger than 1; and transmitting, by the terminal, uplink data to the network side device in N uplink beam directions corresponding to the N uplink sounding pilot indices, wherein transmitting, by the terminal, the uplink data to the network side device in the N uplink beam directions corresponding to the N uplink sounding pilot indices, comprises:

transmitting, by the terminal, the uplink data to the network side device in the N uplink beam directions corresponding to the N uplink sounding pilot indices according to a transmission mode indicated explicitly or implicitly by the network side device, wherein transmitting, by the terminal, the uplink data to the network side device in the N uplink beam directions corresponding to the N uplink sounding pilot indices according to the transmission mode indicated explicitly or implicitly by the network side device, comprises:

transmitting simultaneously, by the terminal using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner; or, transmitting in rotation, by the terminal, the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, transmitting in rotation, by the terminal, the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

2. The method according to claim 1, wherein transmitting, by the terminal, the uplink data to the network side device in the N uplink beam directions corresponding to the N uplink sounding pilot indices according to the transmission mode indicated explicitly or implicitly by the network side device, comprises:

selecting, by the terminal, a part of the N uplink beam directions corresponding to the N uplink sounding pilot indices according to the transmission mode indicated explicitly or implicitly by the network side device, and transmitting, by the terminal, the uplink data to the network side device in the selected part of the N uplink beam directions.

3. A terminal, comprising:
a first processor, a first transceiver, a first storage, a first user interface, and a bus interface, wherein,
the first processor is configured to read programs in the first storage to perform steps in the uplink data transmission method according to claim 1.

4. The terminal according to claim 3, wherein, transmitting, by the terminal, the uplink data to the network side device in the N uplink beam directions corresponding to the N uplink sounding pilot indices according to the transmission mode indicated explicitly or implicitly by the network side device, comprises:

selecting, by the terminal, a part of the N uplink beam directions corresponding to the N uplink sounding pilot indices according to the transmission mode indicated explicitly or implicitly by the network side device, and transmitting, by the terminal, the uplink data to the network side device in the selected part of the N uplink beam directions.

5. An uplink data transmission method, comprising:
transmitting, by a network side device, N uplink sounding pilot indices to a terminal, wherein N is a positive integer larger than 1; and
receiving, by the network side device, uplink data transmitted by the terminal in N uplink beam directions corresponding to the N uplink sounding pilot indices,
wherein, receiving, by the network side device, the uplink data transmitted by the terminal in N uplink beam directions corresponding to the N uplink sounding pilot indices, comprises:
receiving, by the network side device, the uplink data transmitted by the terminal in the N uplink beam directions corresponding to the N uplink sounding pilot indices according to a transmission mode indicated explicitly or implicitly by the network side device,
wherein, receiving, by the network side device, the uplink data transmitted by the terminal in the N uplink beam directions corresponding to the N uplink sounding pilot indices according to the transmission mode indicated explicitly or implicitly by the network side device, comprises:
receiving, by the network side device, the uplink data simultaneously transmitted by the terminal using a spatial multiplexing transmission manner, a port-level transmission diversity transmission manner, a beam-level transmission diversity transmission manner, a non-codebook precoding transmission manner or a single-port transmission manner in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner, wherein the spatial multiplexing transmission manner, the port-level transmission diversity transmission manner, the beam-level transmission diversity transmission manner, the non-codebook precoding transmission manner or the single-port transmission manner is explicitly or implicitly indicated by the network side device; or,
receiving, by the network side device, the uplink data transmitted by the terminal in rotation in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or,
receiving, by the network side device, the uplink data transmitted by the terminal in rotation in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

6. The method according to claim 5, wherein receiving, by the network side device, the uplink data transmitted by the terminal in the N uplink beam directions corresponding to the N uplink sounding pilot indices according to the transmission mode indicated explicitly or implicitly by the network side device, comprises:
receiving, by the network side device, the uplink data transmitted by the terminal in a selected part of the N uplink beam directions, wherein the selection part of the N uplink beams directions is selected by the terminal from the N uplink beam directions corresponding to the N uplink sounding pilot indices according to the transmission mode indicated explicitly or implicitly by the network side device.

7. A network side device, comprising:
a second processor, a second transceiver, a second storage, a second user interface and a bus interface,
wherein the second processor is configured to read programs in the second storage to perform steps in the uplink data transmission method according to claim 5.

8. The network side device according to claim 7, wherein receiving, by the network side device, the uplink data transmitted by the terminal in the N uplink beam directions corresponding to the N uplink sounding pilot indices according to the transmission mode indicated explicitly or implicitly by the network side device, comprises:
receiving, by the network side device, the uplink data transmitted by the terminal in a selected part of the N uplink beam directions, wherein the selection part of the N uplink beams directions is selected by the terminal from the N uplink beam directions corresponding to the N uplink sounding pilot indices according to the transmission mode indicated explicitly or implicitly by the network side device.

9. A terminal, comprising:
a first reception circuit, configured to receive N uplink sounding pilot indices transmitted by a network side device, wherein N is a positive integer larger than 1; and
a first transmission circuit, configured to transmit uplink data to the network side device in N uplink beam directions corresponding to the N uplink sounding pilot indices,
wherein the first transmission circuit is configured to transmit the uplink data to the network side device in the N uplink beam directions corresponding to the N uplink sounding pilot indices according to a transmission mode indicated explicitly or implicitly by the network side device,
the first transmission circuit is specifically configured to transmit simultaneously, using a spatial multiplexing transmission manner, a port-level transmission diversity transmission manner, a beam-level transmission diversity transmission manner, a non-codebook precoding transmission manner or a single-port transmission manner explicitly or implicitly indicated by the network side device, the uplink data to the network side device in a part or all of the N uplink beam directions corresponding to the N uplink sounding pilot indices according to the simultaneous uplink data transmission mode indicated explicitly or implicitly by the network side device and according to the spatial multiplexing transmission manner, the port-level transmission diversity transmission manner, the beam-level transmission diversity transmission manner, the non-codebook precoding transmission manner or the single-port transmission manner; or, the first transmission circuit is specifically configured to transmit in rotation the uplink data to the network side device in a part or all of the N uplink beam directions corresponding to the N uplink sounding pilot indices in units of time slots or in units of subframes according to the time-division transmission mode indicated explicitly or implicitly by the network side device and according to a beam switching manner explicitly or implicitly indicated by the network side device; or, the first transmission circuit is specifically configured to transmit in rotation the uplink data to the network side device in a part or all of the N uplink beam directions corresponding to the N uplink sounding pilot indices in units of symbols according to the time-division transmission mode indicated explicitly or implicitly by the network side device and according to the beam switching manner explicitly or implicitly indicated by the network side device.

10. The terminal according to claim 9, wherein the first transmission circuit is configured to:
select a part of the N uplink beam directions corresponding to the N uplink sounding pilot indices according to the transmission mode indicated explicitly or implicitly by the network side device, and transmit the uplink data to the network side device in the selected part of the N uplink beam directions.

* * * * *